United States Patent [19]  
Christiansen

[11] 4,094,558  
[45] June 13, 1978

[54] LOCKING NUT ASSEMBLY WITH DEFORMABLE LOCKING SLEEVE

[75] Inventor: David Wayne Christiansen, Kennewick, Wash.

[73] Assignee: The Babcock & Wilcox Company, New York, N.Y.

[21] Appl. No.: 717,312

[22] Filed: Aug. 24, 1976

[51] Int. Cl.² .......................................... F16C 33/00
[52] U.S. Cl. .................................. 308/3 R; 151/28; 308/237 R; 403/320
[58] Field of Search ............... 403/320; 151/12 A, 8, 151/28; 308/3 R, 3 A, 237 R

[56] References Cited

U.S. PATENT DOCUMENTS

| 1,364,298 | 1/1921 | Nies | 151/8 |
| 2,783,811 | 3/1957 | Cummaro | 151/8 X |
| 3,319,689 | 5/1967 | McDougall et al. | 151/28 |

Primary Examiner—Trygve M. Blix  
Assistant Examiner—Douglas C. Butler  
Attorney, Agent, or Firm—J. M. Maguire; J. P. Sinnott

[57] ABSTRACT

A self contained nut assembly to allow self nut locking and unlocking for use with a support member. The nut assembly comprises an upper nut containing a pronged locking sleeve. The nut and locking sleeve fit onto a threaded element projecting through a support member. The prongs of the locking sleeve are fashioned with feet for engagement with the support member to restrain selective movement therebetween. Arcuate portions of the sleeve are flared to fill openings in the nut thus locking the assembly in place.

4 Claims, 5 Drawing Figures

U.S. Patent   June 13, 1978   4,094,558
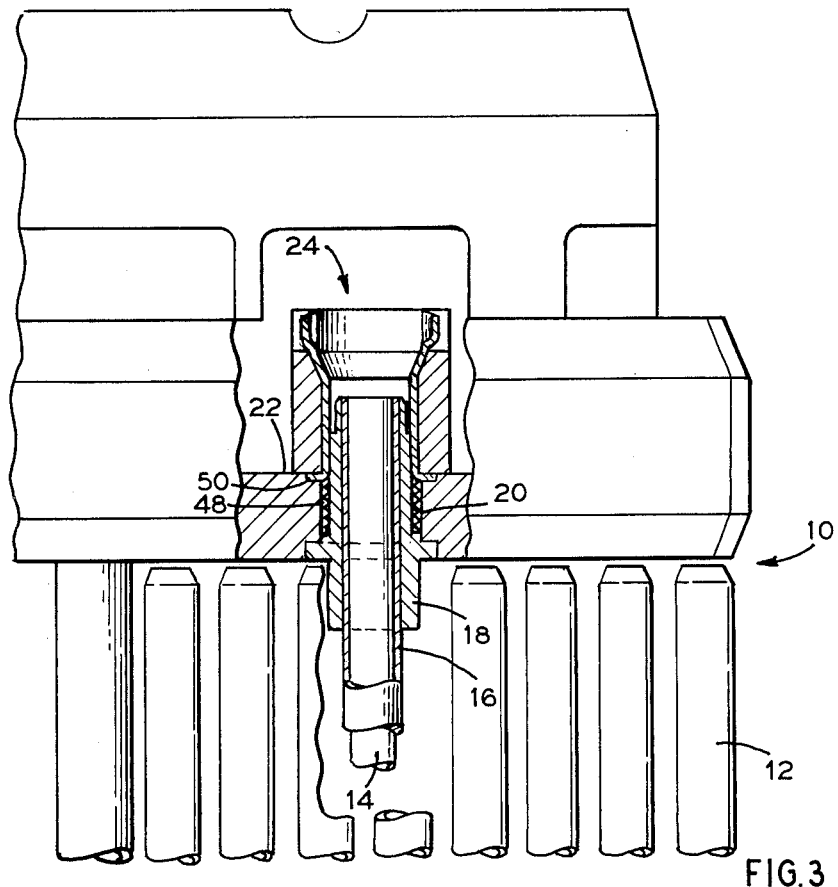
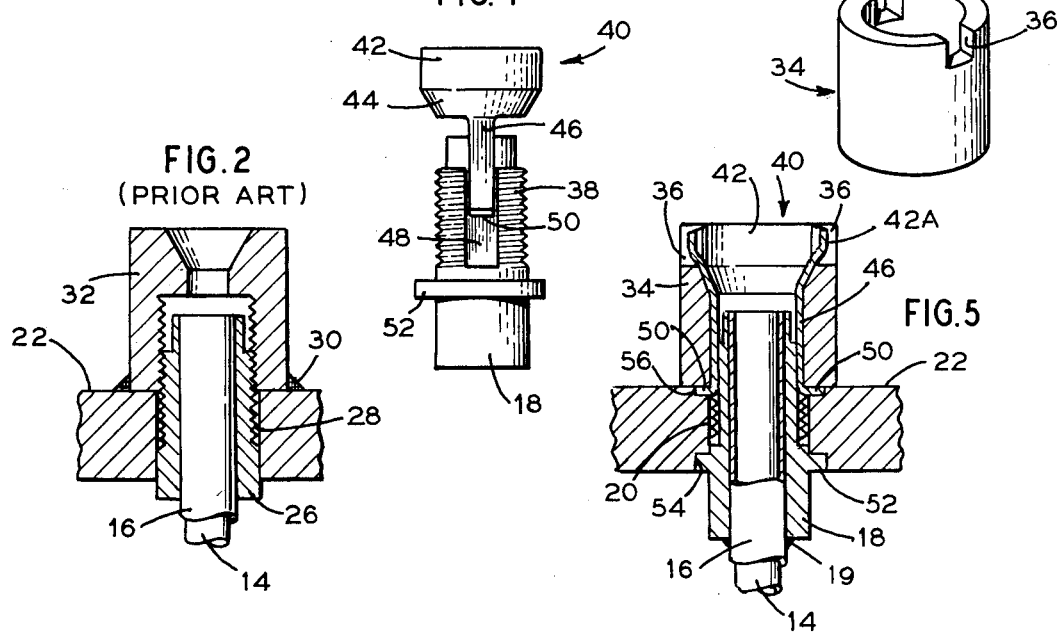

LOCKING NUT ASSEMBLY WITH DEFORMABLE LOCKING SLEEVE

BACKGROUND OF THE INVENTION

This invention relates generally to attaching tubelike members to a support member and more specifically to a nut locking arrangement which can be used in support systems such as for fuel elements in nuclear reactors.

The single most important operational section of a nuclear reactor is the nuclear core. The core basically consists of a number of fuel elements or fuel assemblies which in turn are composed of a number of tubular like entities, including fuel rods and control rods. The present state of the art shows control rods equipped with guide tubes which are supplied with threaded connections to secure the guide tube to the "upper" and "lower" end fittings by a welded lock nut arrangement. Firm attachment is necessary as this particular portion of the assembly can be subjected to any number of disturbances due to fluid flow or thermal variations and the like. However, the need arises to remove the rods for various reasons such as inspection, maintenance or replacement. Removal of the welded lock nut is both time consuming and difficult. What is needed is a simpler approach to the problem but one that will yet provide the structural integrity of welded type construction.

SUMMARY OF THE INVENTION

The present invention is generally directed to a self contained nut assembly to allow for nut locking and unlocking for use with a support or attaching member. This nut arrangement provides simpler and quicker attachment than the welding technique but does not in its simplicity sacrifice the structural integrity of the resulting assembly. More particularly, a channeled and threaded attachment to the guide tube passes through an opening of the nut plate or end fitting. A pronged locking sleeve is inserted into a two section nut, one section of which is fashioned with a counter bore diameter, the other section of which is provided with torquing slots. The nut is then torqued onto the guide tube until torque requirements are reached. Feet at the base of the prong of the sleeve fit through the nut plate opening and form a locking arrangement with the grooves of the nut plate. A crimping implement is then used to distort small arcuate portions of the locking sleeve into the torquing slot of the nut.

Those skilled in the art will appreciate that the present invention introduces a new and improved locking assembly displaying numerous benefits including but not limited to a removable but structurally reliable self contained locking assembly which is simple in its replacement and maintenance.

The various features of novelty which characterize the invention are pointed out with particularity in the claims annexed to and forming a part of this specification. For a better understanding of the invention, its operating advantages and specific objects obtained by its use, referance should be had to the accompanying drawings and descriptive matter in which there is illustrated and described a preferred embodiment of the invention.

BRIEF DESCRIPTION OF THE DRAWINGS

FIG. 1 generally depicts a section of a fuel element assembly;

FIG. 2 shows a prior art arrangement of attaching the guide tubes to the grillage;

FIG. 3 shows the nut with torquing slots;

FIG. 4 shows the locking sleeve, without the nut, fitting onto the upper sleeve; and FIG. 5 shows a sectional view of an assembly employing the locking nut of the present invention.

DESCRIPTION OF THE PREFERRED EMBODIMENT

The present invention is generally directed at a locking nut device and in particular at a locking nut useful in attaching a threaded element to a support member. While the present invention can be of use in numerous applications, that is in any situation where a threaded element such as a bolt need be attached to a member such as a support member, bar, shell or casing to bring about a desired connection, a particular embodiment wherein a guide tube is attached to a nut plate or grillage in a fuel assembly is hereinafter described.

FIG. 1 generally depicts a section of a fuel element assembly 10. Bundled within assembly 10 are fuel rods 12. The fuel rods are constructed of a zircalloy sheath and are in the form of hollow cylinders with a length many times its diameter. The fuel rods are generally internally pressurized with helium to prevent collapse. The rods 12 contain an energy source in the form of pelletized or powdered nuclear active material such as the reactive uranium, thorium or plutonium compounds. Interspersed within the assembly 10 are the control rods 14. Control rods 14 are housed in a sleeve section known as the guide tubes 16. The guide tubes provide continuous guidance for the control assemblies as well as structural continuity for the fuel assembly. Each upper end guide tube is fitted with an end sleeve 18 which fits through openings 20 of grillage or nut plate 22. The end sleeve is firmly attached to grillage 22 by the nut lock assembly 24 more fully described hereinafter. Grids (not shown) are strategically placed along the length of the fuel rods 12 to preserve vertical alignment of the rods and prevent adjacent rods from colliding as fluid rushes through the assembly. The grids, which are generally constructed from inconel strips, are slotted and welded together in an egg crate fashion to form a 15 by 15 lattice for the fuel rods. Such a fuel assembly as above described can contain 208 fuel rods, 16 guide tubes and one instrument tube (not shown) in each assembly. As will be appreciated, the reactor nuclear core consists of numerous such fuel assemblies.

FIG. 2 shows a prior art arrangment popularly employed for attaching the guide tubes 16 to the grillage 22. The guide tube portion nearest the upper end of the tube is fitted with an upper sleeve 26 with threading 28 running along a portion of the sleeve length. The upper sleeve 26 encompasses the guide tube 16 such that part of the threading 28 of the sleeve extends above grillage 22 but only the unthreaded area of the sleeve extends below the grillage. Upper nut 32, which is also threaded, is torqued onto the sleeve 26 by tightening the nut along threading 28 to the proper torque requirement. The nut base is flush to the top face of grillage 22 and is firmly affixed thereto by weld 30. To replace or service the guide tube or control rod, one must first remove the nut 32 which requires removing the weld 30. Not only is such a procedure time consuming, but destructive of the upper face of grillage 22 as well as nut 32.

FIGS. 3 and 4 show individual elements of the locking nut assembly and FIG. 5 shows a section of the final assembly. FIG. 3 depicts nut 34 which is provided with torquing slots 36. The lower inner portion (not shown) of nut 34 is counter bored for threading interaction with the threads 38 (FIG. 4) of end sleeve 18 (FIG. 4). The remaining internal portion of nut 34 is unthreaded and contoured to accommodate locking sleeve 40 (FIG. 4) in a firm fitting manner. Locking sleeve 40, composed of a deformable metallic material, is comprised of a crowning section 42 and a transition section 44. Prongs 46 depend from transition section 44, and as shown, fit into longitudinal channels 48 cutting thread 38. Feet 50, preferably located on prongs 46 at a section of the prong furthermost from the transition section 44, are arranged with respect to the prong in a substantially perpendicular orientation. Feet 50 protrude away from each of the longitudinal channels 48. Located at the base of threads 38 is positioning ring 52.

FIG. 5 shows a detail of that section of the fuel assembly employing the present invention in a fully assembled embodiment. Guide tube 16, fitted with end sleeve 18, is inserted through opening 20 of grillage 22. End sleeve 18 is firmly affixed to guide tube 16 by weld 19. The lower face of grillage 22 is formed with cavity 54 to receive positioning ring 52. Such positioning orients the tube and sleeve for application of the locking nut arrangement. Locking sleeve 40 is inserted into nut 34 such that feet 50 of prong 46 rest against the lower surface of nut 34. Nut 34 with locking sleeve 40 is positioned on the fitting such that feet 50 lock into slotted grooves 56 on the upper face of grillage 22. Prongs 46 are aligned within longitudinal channels 48. With the sleeve in such position, nut 34 is torqued to its torquing requirement. The guide tubes are generally welded to a lower end fitting (not shown) and guide tube rotation is thus prevented. With nut 34 properly tightened, arcuate portions of crowning section 42 are flared into torquing slots 36 by use of a crimping tool (not shown). Such an arrangement prohibits the nut from torquing and restrains rotation of the guide tube. The assembly provides an arrangement which is simple, self contained, readily removable and structurally reliable. When removal of the assembly is desired, the deformed portions of the crowning section on the locking sleeve are forced inward toward the nut interior. The nut is then torqued off while the guide tube is retained in position.

FIG. 5 shows the preferred arrangement with the locking sleeve, that is two prongs 46 and two portions of the locking sleeve distorted into torquing slots 36. However, any number and any combination of prongs and torquing slots may be employed in the practice of the invention.

The embodiments of the invention in which an exclusive property or privilege is claimed are defined as follows:

1. A locking nut assembly for attachment of a threaded element with at least one channel to a support member comprising: a nut for engagement with the threaded element, the nut being provided with at least one opening, a locking sleeve for insertion within the nut, the sleeve being formed with at least one prong in parallel alignment with the channel of the threaded element, the prong being formed with a foot adapted to interact with the support member to inhibit relative motion therebetween, and at least one portion of the inserted locking sleeve being deformed to fill the opening of the nut to restrain relative movement of the nut with respect to the threaded element.

2. A locking nut assembly as in claim 1 wherein the support member is a nut plate, the nut is provided with a pair of openings, the sleeve is formed with a pair of prongs in parallel alignment with the channel, and each prong is formed with a foot.

3. A locking nut assembly as in claim 2 wherein the threaded element is a guide tube with a threaded fitting.

4. A locking nut assembly as in claim 3 wherein the openings are torquing slots.

* * * * *